(12) United States Patent
Hidaka et al.

(10) Patent No.: US 9,755,556 B2
(45) Date of Patent: Sep. 5, 2017

(54) DRIVE CONTROL APPARATUS AND FUEL PUMP USING THE SAME

(71) Applicant: DENSO CORPORATION, Kariya, Aichi-pref. (JP)

(72) Inventors: Yuuji Hidaka, Chiryu (JP); Kiyoshi Nagata, Nagoya (JP)

(73) Assignee: DENSO CORPORATION, Kariya (JP)

( * ) Notice: Subject to any disclaimer, the term of this patent is extended or adjusted under 35 U.S.C. 154(b) by 98 days.

(21) Appl. No.: 14/539,328

(22) Filed: Nov. 12, 2014

(65) Prior Publication Data

US 2015/0130377 A1    May 14, 2015

(30) Foreign Application Priority Data

Nov. 12, 2013 (JP) ................. 2013-233829

(51) Int. Cl.
| | |
|---|---|
| H02P 6/18 | (2016.01) |
| H02P 6/20 | (2016.01) |
| F04D 5/00 | (2006.01) |
| F04D 15/00 | (2006.01) |
| F04D 29/02 | (2006.01) |
| F04D 29/20 | (2006.01) |

(Continued)

(52) U.S. Cl.
CPC ............. *H02P 6/205* (2013.01); *F04D 5/002* (2013.01); *F04D 13/0693* (2013.01); *F04D 15/0077* (2013.01); *F04D 29/026* (2013.01); *F04D 29/20* (2013.01); *H02P 6/182* (2013.01); *H02P 6/21* (2016.02); *F05D 2300/43* (2013.01); *H02P 2203/03* (2013.01)

(58) Field of Classification Search
USPC .................. 318/596, 609, 610, 626; 388/906
See application file for complete search history.

(56) References Cited

U.S. PATENT DOCUMENTS

| | | | | |
|---|---|---|---|---|
| 4,408,148 A | * | 10/1983 | Herzog | .................. G05B 11/42 |
| | | | | 318/610 |
| 4,603,597 A | * | 8/1986 | Onorati | ..................... F16D 1/06 |
| | | | | 403/326 |

(Continued)

FOREIGN PATENT DOCUMENTS

| | | |
|---|---|---|
| JP | 4-312390 | 11/1992 |
| JP | 6-14592 | 1/1994 |

(Continued)

OTHER PUBLICATIONS

Office Action (2 pages) dated Oct. 1, 2015, issued in corresponding Japanese Application No. 2013-233829 and English translation (3 pages).

*Primary Examiner* — Bentsu Ro
(74) *Attorney, Agent, or Firm* — Nixon & Vanderhye P.C.

(57) ABSTRACT

A microcomputer operates as a positioning part positions a rotor at a control start position, which is a position of the rotor relative to a stator to be able to start controlling driving of a brushless motor, by supplying a current to a winding set a number of times "n" (n is an integer equal to two or more) before starting to control driving of the brushless motor. The microcomputer, operating as the positioning part, controls electric power supplied to the winding set so that the rotor rotates in the same direction at each of "n" times of power supply to the winding set, that is, at each of "n−1" times of switchovers of power supply to the winding set.

9 Claims, 8 Drawing Sheets

(51) Int. Cl.
    *F04D 13/06*      (2006.01)
    *H02P 6/182*      (2016.01)
    *H02P 6/21*       (2016.01)

(56) References Cited

U.S. PATENT DOCUMENTS 4,631,457 A * 12/1986 Tanuma .................... H02P 6/20
                                                     318/265
2006/0076911 A1   4/2006  Kuroshima et al.
2009/0174350 A1   7/2009  Kuroda et al.

FOREIGN PATENT DOCUMENTS

| | | |
|---|---|---|
| JP | 6-37587 | 5/1994 |
| JP | 2011-036083 | 2/2011 |
| JP | 2013-150536 | 8/2013 |
| WO | WO 2015/072124 | 5/2015 |

\* cited by examiner

DRIVE CONTROL APPARATUS AND FUEL PUMP USING THE SAME

CROSS REFERENCE TO RELATED APPLICATION

This application is based on and incorporates herein by reference Japanese patent application No. 2013-233829 filed on Nov. 12, 2013.

FIELD

The present disclosure relates to a drive control apparatus and a fuel pump using the same.

BACKGROUND

Some drive control apparatuses control driving of a brushless motor, which has no sensor for detecting a position of a rotor. For example, patent document JP-A-2011-360831 discloses one exemplary drive control apparatus, which controls driving of a brushless motor used as a drive source for a fuel pump.

In a case of a sensorless brushless motor, which is not equipped with a sensor for detecting a position of a rotor, the position of the rotor relative to a stator is not known under a state that the rotor is at rest before motor drive control is started. It is therefore necessary to start controlling driving of the motor after forcibly positioning the rotor to a control start position, which is the position of the rotor relative to the stator for starting the drive control. According to the drive control apparatus of the patent document, the position of the rotor relative to the stator is detected by switching over power supply to windings of plural phases. The control start position is determined based on a detected position of the rotor. The rotor is positioned to a determined control start position. Thus a period of time required before starting the drive control for the motor is shortened.

According to the drive control apparatus of the patent document, the rotor rotates in one direction (normal direction) or the other direction (reverse direction) depending on the position of the rotor relative to the stator at the time of power supply. In a case that the brushless motor is used as the drive source for the fuel pump, a shaft of the brushless motor is generally press-fitted into a hole part of an impeller so that the impeller is rotated by the brushless motor. An end part of the shaft and the hole part of the impeller are formed generally in an alphabetically D shape in section. To absorb manufacturing error and assembling error of the impeller, a certain clearance is provided between the end part of the shaft and the hole part of the impeller. For this reason it is likely that an angled corner part of an outer wall of the end part of the shaft collides a planar surface part of an inner wall of the hole part of the impeller with a certain acceleration when the shaft starts to rotate.

When the brushless motor of the fuel pump is driven by the drive control apparatus of the patent document, the shaft rotates in the normal direction or in the reverse direction each time the power supply to the windings is switched over at the time of positioning, which is performed before starting the drive control. It is therefore likely that the outer wall of the end part of the shaft collides against the inner wall of the hole part of the impeller more frequently and collision energy generated at the time of collision increases in comparison to a case that a brushless motor, which needs no positioning of a rotor and rotates in only a normal direction, is driven. Thus the impeller tends to wear and breaks. In an idle-stop vehicle and a hybrid vehicle, which are introduced more and more in recent years, a fuel pump is turned on and off more frequently in a certain period. For this reason, the collision of the shaft increases wear or breakage of the impeller. Further, the wear or the breakage of the impeller increases as the number of switchover of power supply to the windings at the time of the positioning increases.

SUMMARY

It is therefore an object to provide a drive control apparatus, which is capable of reducing wear and breakage of a rotary member driven by a brushless motor, and a fuel pump using the same.

According to one aspect, a drive control apparatus is provided for controlling driving of a brushless motor, which includes a stator on which windings of plural phases are wound, a rotor provided rotatably relative to the stator, and a shaft provided in a radial center of the rotor and having an end part fitted into a hole part of a rotary member for rotation with the rotor. The drive control apparatus comprises a control unit for controlling electric power supplied to the windings thereby to control a rotation of the rotor.

The control unit includes a positioning part for supplying the electric power to the windings of the plural phases "n" times ("n" being an integer equal to 2 or more) before starting to control driving of the brushless motor thereby to position the rotor to a control start position, at which controlling driving of the brushless motor is started. The positioning part controls the electric power supplied to the windings to rotate the rotor in a same direction in each time of power supply when the windings of the plural phases are supplied with electric power "n" times.

DETAILED DESCRIPTION OF EMBODIMENT

Figure 1:
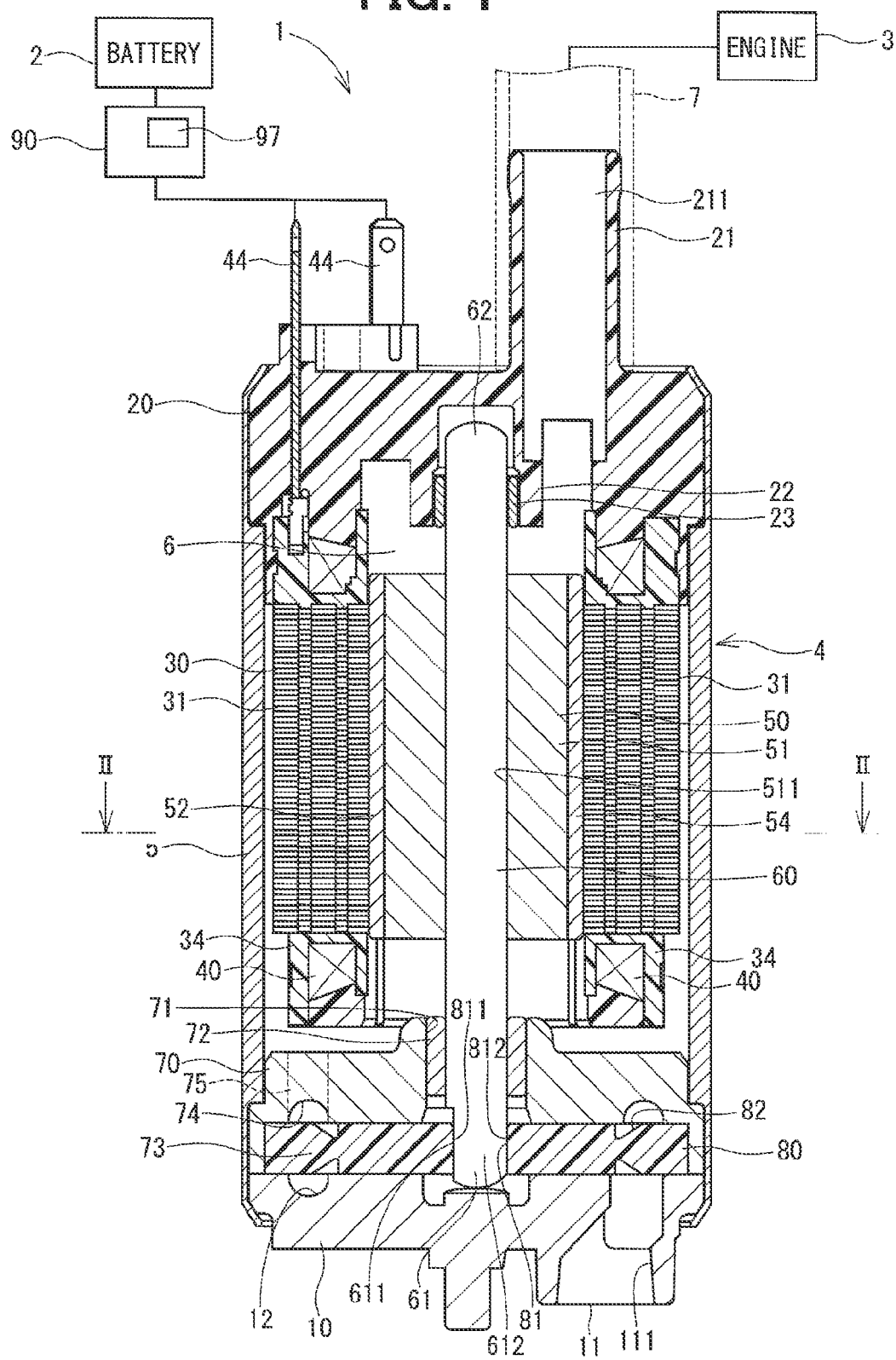
FIG. 1 is a diagrammatic view of a drive control apparatus and a fuel pump in section according to a first embodiment.

A drive control apparatus and a fuel pump using the same will be described with reference to various embodiments shown in the accompanying drawings. For simplifying a description of the embodiments, only one or several parts among plural same parts or similar parts will be assigned with reference numerals.

First Embodiment

Figure 4:
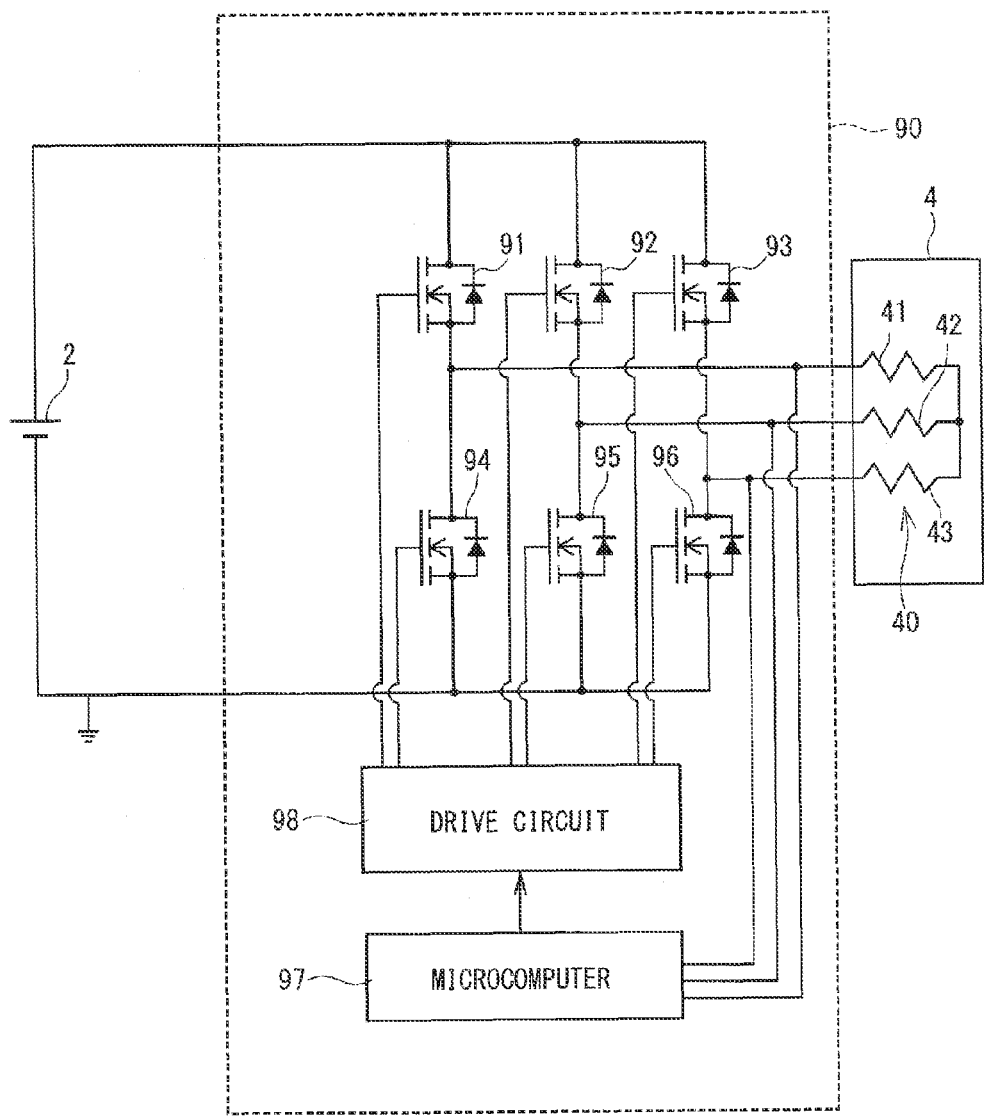
FIG. 4 is a circuit diagram of the drive control apparatus according to the first embodiment.

A fuel pump and a drive control apparatus for the fuel pump according to a first embodiment are shown in FIG. 1 and FIG. 4, respectively. A fuel pump 1 shown in FIG. 1 is driven with electric power supplied from a battery 2 of a vehicle, for example. The fuel pump 1 suctions fuel from a fuel tank (not shown) and discharges and supplies the fuel to an internal combustion engine, which is a fuel supply subject. In the first embodiment, the fuel pump 1 is mounted on a hybrid vehicle (not shown), for example. As a result, the fuel pump 1 is switched on and off a number of times during a predetermined period, for example, a presumed life time of a vehicle.

Figure 2:
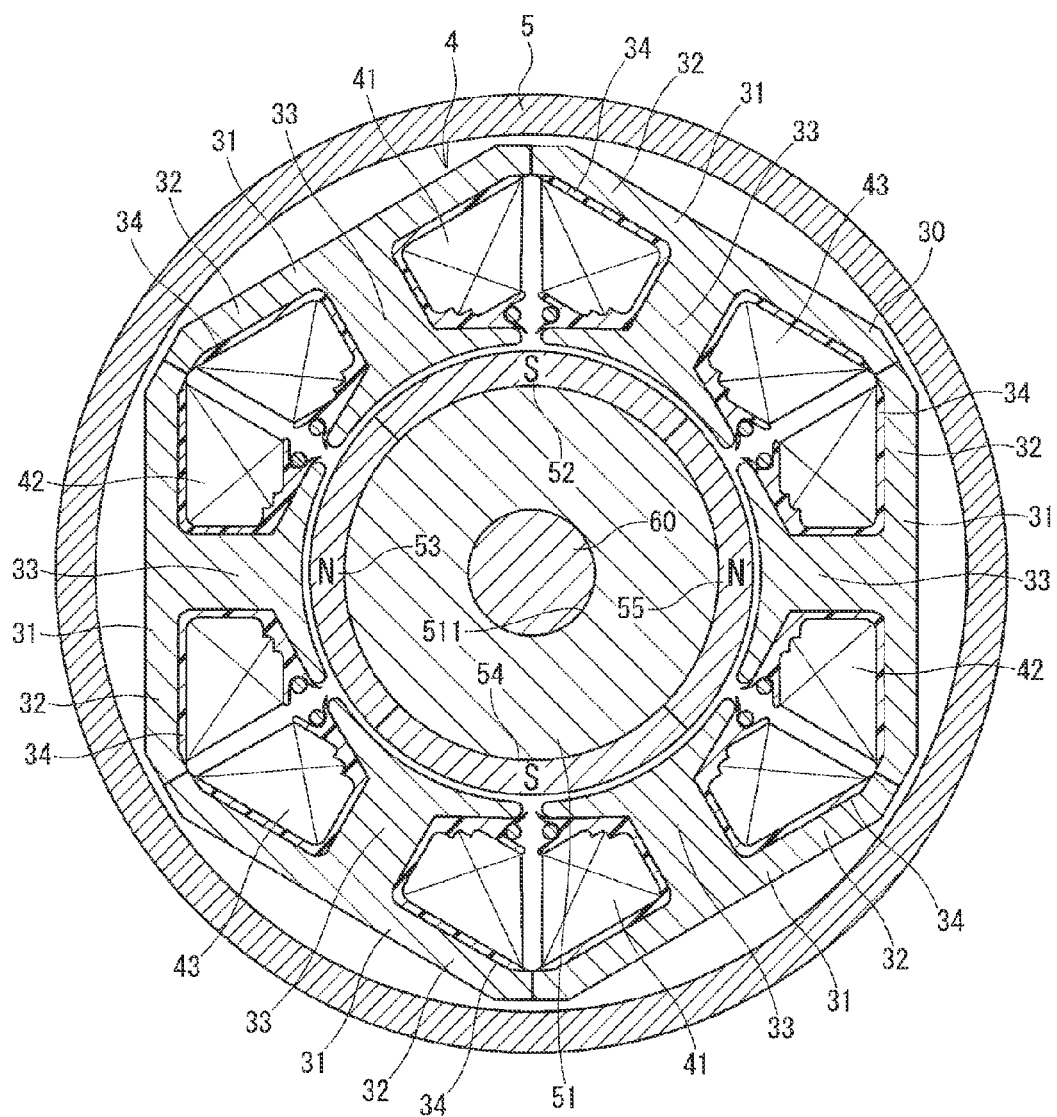
FIG. 2 is a sectional view of the fuel pump taken along a line II-II in FIG. 1.
Figure 3:
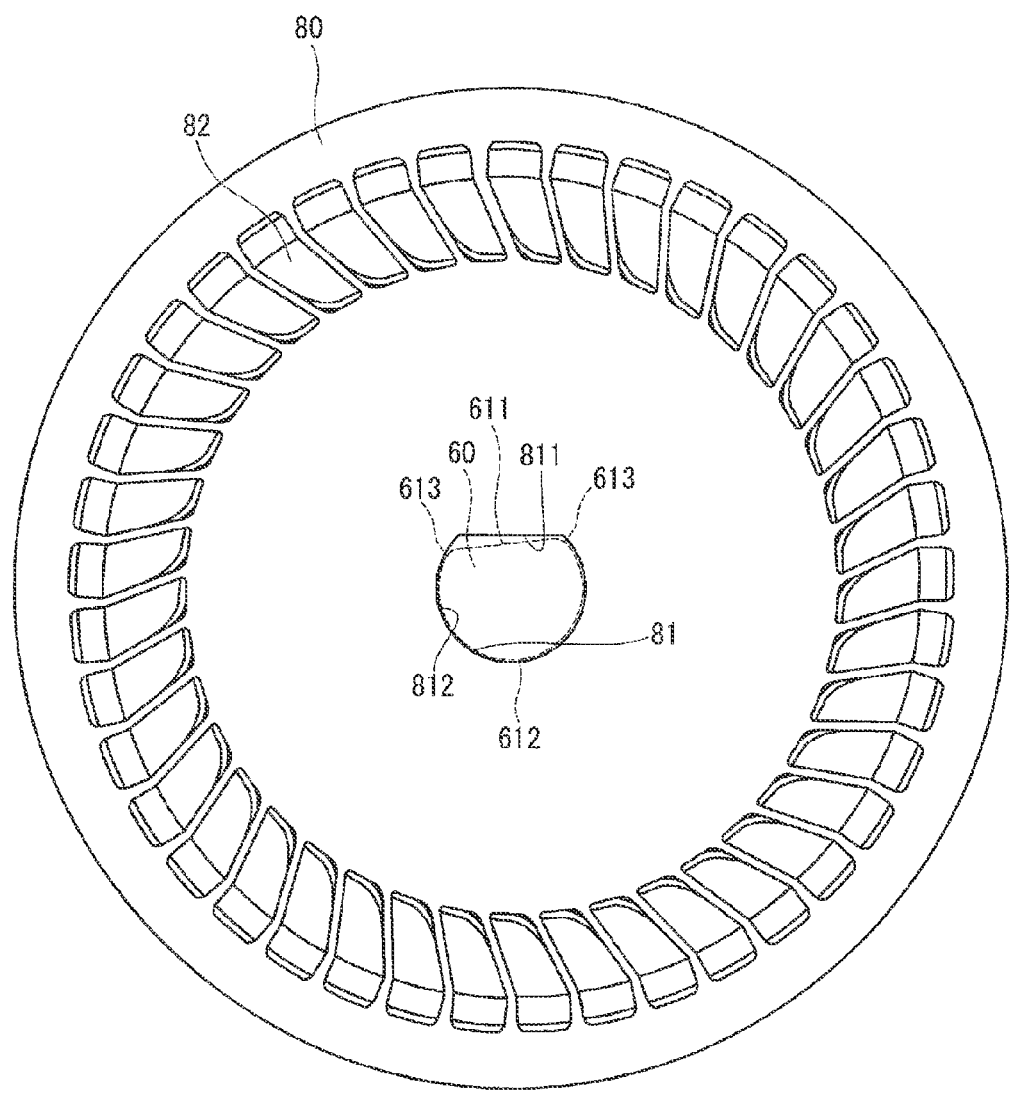
FIG. 3 is a side view of an impeller of the fuel pump according to the first embodiment.

The fuel pump 1 includes a brushless motor 4, a housing 5, a pump cover 10, an end cover 20, an impeller 80 as a rotary member, a drive control apparatus 90 and the like. The brushless motor 4 includes a stator 30, a winding set 40, a rotor 50, a shaft 60 and the like. As shown in FIG. 2, the stator 30 includes segments 31, insulators 34, and the like.

Each segment 31 is formed of a stacked iron core, which is a stack of thin plates of magnetic material. In the first embodiment, six segments are provided. The segment 31 has a yoke part 32 and tooth part 33 extending perpendicularly from the yoke part 32. The stator 30 is formed in a tubular shape so that six yoke parts 32 form a tube of a hexagonal shape in section. The tooth part 33 is formed to extend radially inward from a center of the yoke part 32. The insulator 34 is formed of resin and provided at the tooth part 33 of the segment 33.

The winding set 40 includes a U-phase winding 41, a V-phase winding 42 and a W-phase winding 43, each of which is formed of a metal such as copper, for example. Each winding is wound about the insulator 34 and provided about the tooth part 33 of the stator 30. The U-phase winding 41, the V-phase winding 42 and the W-phase winding 43 form a U-phase, a V-phase and a W-phase of the brushless motor 4, respectively. The rotor 50 is formed in a cylindrical shape and includes a core 41 and permanent magnets 52, 53, 54 and 55. The rotor 50 is provided rotatably inside the stator 30.

The core 51 is formed in a generally cylindrical shape and has a hole part 511 at a center thereof. The magnets 52, 53, 54 and 55 are arranged on an outer wall of the core 51 to align in a peripheral direction. The magnets 52 and 54 are magnetized to provide S-poles at radially outer sides of the rotor 50. The magnets 53 and 55 are magnetized to provide N-poles at radially outer sides of the rotor 50. That is, the outer wall of the rotor 50 are magnetized to opposite polarities N and S alternately in the peripheral direction. The rotor 50 preferably has a weight of 30 to 60 grams and a radius of 15 to 19 millimeters. In the first embodiment, the rotor 50 is set to have a weight of 47 grams and a radius of 17 millimeters.

As described above, in the first embodiment, the brushless motor 4 is a three-phase brushless motor of four poles and six slots. In the first embodiment, the brushless motor 4 does not include any position sensor, which detects a position of the rotor 50. That is, the brushless motor 4 is a sensorless type brushless motor. Since the fuel pump 1 is switched on and off a number of times in a predetermined period in the first embodiment, the brushless motor 4 is turned on and off a number of times in the predetermined period correspondingly.

The shaft 60 is formed of a metal such as stainless, for example, in a rod shape, that is in an elongated circular column shape. The shaft 60 is firmly fitted in the hole part 51 of the core 51 of the rotor 50. Thus the shaft 60 is rotatable integrally with the rotor 50.

In the first embodiment, one end part 61 of the shaft 60 is formed to have a section in an alphabet D shape on a plane perpendicular to the axis. Thus the one end part 61 of the shaft 60 is formed to have an outer wall in a flat surface shape and an outer wall 612 in a curved surface shape. A corner part 613 including a boundary between the outer wall 611 and the outer wall 612 is chamfered in a smooth curved surface shape. The housing 5 is formed of a metal such as iron, for example, in a generally cylindrical shape. The surface of the housing 5 is covered with zinc plating or tin plating.

The pump cover 10 is formed of a metal such as aluminum, for example, in a generally disk shape and closes one end of the housing 5. One end of the housing 5 is crimped in a radially inward direction so that the pump cover 10 is fixed at the inside of the housing 5 and restricted from detachment in the axial direction. As shown in FIG. 1, the pump cover 10 has an inlet part 11 in a cylindrical shape. An inlet passage 111 is formed inside the inlet part 11 to penetrate the pump cover 10 in a plate thickness direction.

The end cover 20 is formed of resin, for example, and shaped in a cylindrical shape to close the other end of the housing 5. The end cover 20 is press-fitted so that its outer ridge part is engaged with the inside of the other end of the housing 5. The other end of the housing 5 is crimped in a radially inward direction so that the end cover 20 is fixed in the inside of the housing 5 and restricted from detachment in the axial direction.

As shown in FIG. 1, the segments 31, the insulators 31 and the winding set 40, which form the stator 30, are molded by resin, which forms the end cover 20. That is, the stator 30 is resin-molded and formed integrally with the end cover 20. Thus, the stator 30 is accommodated inside the housing 5 coaxially with the housing 5.

A pump casing 70 is located between the pump cover 10 and the stator 30. The pump casing 70 is formed of a metal such as aluminum, for example, and formed in a generally cylindrical shape. A hole par 71 is formed in a central part of the pump casing 70 to penetrate the pump casing 70 in the plate thickness direction. A bearing member 72 is fitted in the hole part 71 of the pump casing 70. The bearing member is formed of a sintered metal of copper group, for example.

The bearing part 22 is formed in the center of the side end surface of the rotor 50. The bearing part 22 is formed in the center of the end cover 20 and protrudes in a cylindrical shape toward the rotor 50 side. Here, the central axis of the bearing part 22 and the central axis of the end cover 20 coincide. That is, the bearing part 22 is located on the central axis of the end cover 20. A bearing member 23 is fitted inside the bearing part 22. Similarly to the bearing member 72, the bearing member 23 is made of a sintered metal of copper group, for example, and formed in a cylindrical shape.

The hole part 71 bears one end part 61 side of the shaft 60 via bearing member 72. The bearing part 22 bears the other end part 62 side of the shaft 60 via the bearing member 23. Thus, the rotor 50 and the shaft 60 are supported rotatably by the pump casing 70 and the end cover 20 via the bearing member 72 and the hold part 71 as well as the bearing member 23 and the bearing part 22.

An impeller 80 is formed of resin such as PPS, for example, in a generally disk shape. The impeller 80 is housed inside a pump chamber 73, which is formed in a generally disk shape between the pump cover 10 and the pump casing 70. The impeller 80 has a hole part 81, which penetrates in the plate thickness direction in the center thereof. The hole part 81 is formed in an alphabet D shape in correspondence to a sectional shape of one end part 61 of the shaft 60. Thus the hole part 81 is defined by an inner wall 811 in a planar surface shape and an inner wall 812 in a curved surface shape.

One end part 61 of the shaft 60 is provided to be in the pump chamber 73. One end part 61 of the shaft 60 is firmly fitted in a hole part 81 of the impeller 80. Thus the impeller 80 rotates within the pump chamber 73 when the shaft 60 rotates with the rotor 50.

In the first embodiment, the end part 61 of the shaft 60 is firmly fitted in the hole part 81 and a predetermined clearance is provided between the end part 61 of the shaft 60 and the hole part 81. This clearance absorbs manufacturing error and assembling error of the impeller 60.

A generally C-shaped groove 12 is formed on a surface, which is on the impeller 80 side of the pump cover 10. This groove 12 is connected to the inlet passage 111. A generally C-shaped groove 74 is formed on a surface of the impeller 80 side of the pump casing 70. A passage 75, which penetrates the pump casing 70 in the plate thickness direction, is formed in the groove 74. In the impeller 80, a vane part 82 is formed at a position, which corresponds to the groove 12 and the groove 74.

A discharge part 21 is provided in the end cover 20. The discharge part 21 is formed of resin integrally with the end cover 20 in such a manner to protrude in a tubular shape from an end surface opposite to the pump cover 10 of the end cover 20. A discharge passage 211 is formed in the discharge part 21. The discharge passage 211 is communicated with a space provided between the pump cover 10, which is inside the housing 10, and the cover end 20.

As shown in FIG. 1, the other end of a supply pipe 7, one end of which is connected to the internal combustion engine 3, is connected to the discharge part 21. Thus fuel pressurized in the space by rotation of the impeller 80 flows through the discharge passage 211. This fuel is discharged from the discharge part 21 and supplied to the internal combustion engine 3 through the supply pipe 7.

Terminals 44 are provided on the end cover 20. Each terminal 44 is formed of a metal such as copper for example in a rod shape. In the first embodiment, three terminals 44 are embedded in the end cover 20 such that one ends of the terminals 44 are connected to the U-phase winding 41, the V-phase winding 42 and the W-phase winding 43, respectively, and the other ends of the terminals 44 are exposed from the end surface opposite to the pump cover 10 of the end cover 20.

The drive control apparatus 90 is a fuel pump controller (FPC), which controls driving of the brushless motor 4 of the fuel pump 1. The drive control apparatus 90 is connected to the terminals 44 and the battery 2 and supplies the electric power from the battery 1 to the brushless motor 4 while controlling the power.

As shown in FIG. 4, the drive control apparatus 90 includes switching elements 91 to 96, a microcomputer 97 and a drive circuit 98. The switching elements 91 to 96 form a three-phase inverter. In the inverter, six switching elements 91 to 96 are connected in a bridge form thereby to switch over power supply to the U-phase winding 41, the V-phase winding 42 and the W-phase winding 43 of the winding set 40. In the first embodiment, the switching elements 91 to 96 are MOSFETs (metal-oxide-semiconductor field-effect transistors). The switching elements 91 to 96 are referred to as FETs 91 to 96 below.

Drains of three FETs 91 to 93 are connected to a positive polarity side of the battery 2. Sources of the FETs 91 to 93 are connected to drains of the FETs 94 to 96, respectively. Sources of the FETs 94 to 96 are connected to the ground, that is, a negative polarity side of the battery 2.

As shown in FIG. 4, a junction between the FET 91 and the FET 94, which are paired, is connected to one end of the U-phase winding 41. A junction between the FET 92 and the FET 95, which are paired, is connected to one end of the V-phase winding 42. A junction between the FET 93 and the FET 96, which are paired, is connected to one end of the W-phase winding 43.

The microcomputer 97 is a computer, which is formed of a CPU, a ROM, a RAM, an I/O and the like. The microcomputer 97 generates a control signal based on input signals and outputs the control signal to the drive circuit 98 by executing arithmetic operations according to programs stored in the ROM. The drive circuit 98 generates signals for switching the FETs 91 to 96 to turn on and off in response to the control signal inputted from the microcomputer 97 and outputs the signals to gates of the FETs 91 to 96. The FETs 91 to 96 thus perform switching operations to supply the electric power from the battery 2 to the winding set 40 (U-phase winding 41, V-phase winding 42 and W-phase winding 43). When the microcomputer 97 switches over the power supply to the U-phase winding 41, the V-phase winding 42 and the W-phase winding 43 via the drive circuit 98 and the FETs 91 to 96, the stator 30 generates a rotating magnetic field to rotate the rotor 50. When the rotor 50 rotates with the shaft 60, the impeller 80 fitted with the shaft 60 rotates.

Thus the microcomputer 97 is capable of controlling the rotation of the rotor 50 (brushless motor 4) by controlling the power supplied to the winding set 40. The microcomputer 97 corresponds to a control unit.

Further, as shown in FIG. 4, the microcomputer 97 is connected to the U-phase winding 41, the V-phase winding 42 and the W-phase winding 43. The microcomputer 97 thus detects voltages applied to the U-phase winding 41, the V-phase winding 42 and the W-phase winding 43.

The control of driving the brushless motor is started as described below. Since the brushless motor 4 is the sensorless type in the first embodiment, the position of the rotor 50 relative to the stator 30 is not known under a state that the rotor 50 is at rest before the start of controlling driving of the motor 4. For this reason, the control of driving need be started after forcibly positioning the rotor 50 to the control start position (N-pole position when the winding set 40 is supplied with power), which is the position of the rotor 50 relative to the stator 30 where the control of driving can be started.

Figure 5A:
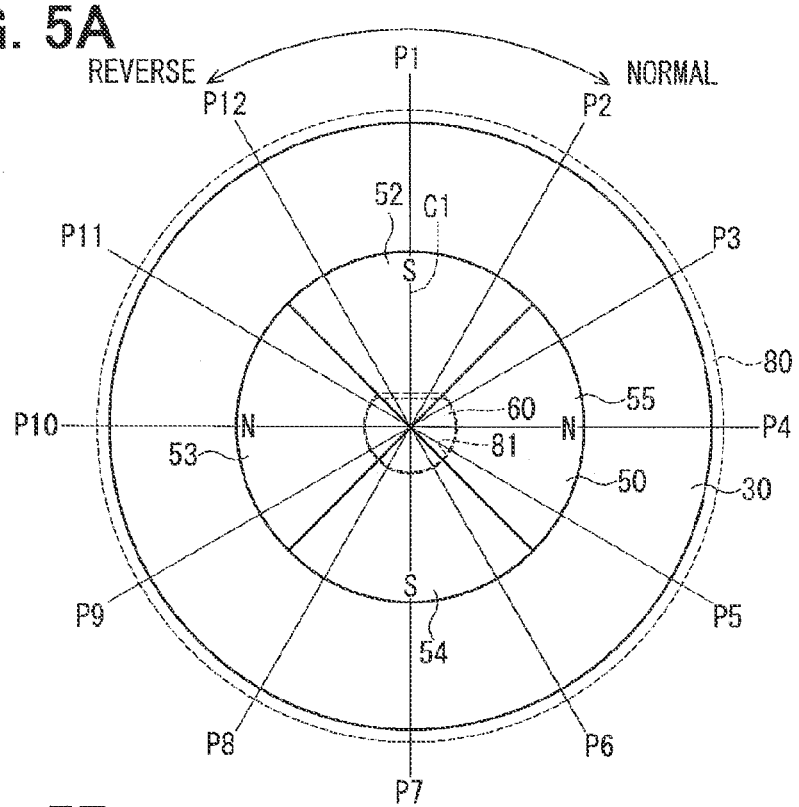
FIG. 5A is a schematic view showing a state where a rotor is at a position corresponding to a start control position.
Figure 5B:
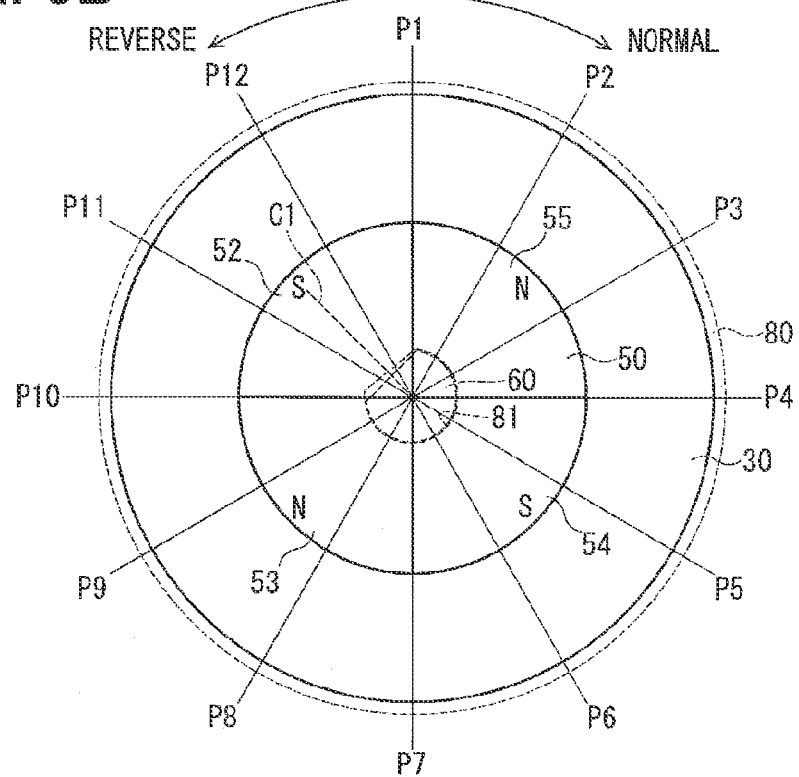
FIG. 5B is a schematic view showing a state where the rotor is at a position other than the control start position.

In the first embodiment, since the brushless motor 4 has a six-slot configuration, the control start position is set to any one of twelve positions (positions or angles P1 to P12) as shown in FIG. 5A and FIG. 5B. For this reason, when the center of the magnets of the rotor 50 is located at any one of the positions P1 to P12, it is possible to start controlling driving of the brushless motor 4 (FIG. 5A). In FIG. 5A and FIG. 5B, a normal direction (clockwise direction) is a direction of rotation of the rotor 50 (shaft 60), with which the impeller 80 can pressurize fuel, and a reverse direction (counter-clockwise direction) is a direction of rotation of the rotor 50 (shaft 60), with which the impeller 80 cannot pressurize fuel.

In the first embodiment, the microcomputer 97 supplies power to the winding set 40 in the number of "n" times ("n" is an integer equal to two or more) before starting to control driving of the brushless motor 4 and position the rotor 50 to the control start position (any of positions P1 to P12), at which controlling driving of the brushless motor 4 can be started. Here, the microcomputer 97 operates as a positioning part. Supplying power to the winding set 40 "n" times corresponds to switching over the power supply to the U-phase winding 41, the V-phase winding 42 and the W-phase winding 43 "n−1" times. In the first embodiment, the microcomputer 97 supplies power to the winding set 40 at least two times to position the rotor 50 before starting to control driving of the brushless motor 4. That is, the power supply to the winding set 40 is switched over at least once.

The microcomputer 97 operates as the positioning part and controls the power supplied to the winding set 40 thereby to rotate the rotor 50 in the same direction at every power supply when the power supply to the winding set 40 is switched over "n" times. That is, as shown in FIG. 5A and FIG. 5B, the power supplied to the winding set 40 is controlled such that, when the rotor 50 is rotated in the reverse direction in the first power supply, the rotor 50 is rotated also in the reverse direction at the second time.

In the first embodiment, the microcomputer 97 operating as the positioning part supplies power to the winding set 40 to rotate the rotor 50, which is at rest. Thus the position of the rotor 50 relative to the stator 30 can be detected. Specifically, the microcomputer 97 supplies power to two of the U-phase winding 41, the V-phase winding 42 and the W-phase winding 43, for example, to forcibly rotate the rotor 50. With rotation of the rotor 50, the microcomputer 97 detects the position of the rotor 50 by detecting an induction voltage generated in the winding of the winding set 40, which is not supplied with power. The microcomputer 97 also operates as a position detecting part. The microcomputer 97 thus detects also the direction of rotation of the rotor 50 based on a change in the detected induction voltages.

The microcomputer 97 operating as the position detecting part determines the control start position based on the detected position and the detected rotation direction of the rotor 50. Specifically, as shown in FIG. 5B for example, upon detection that the circumferential center C1 (S pole) of the magnet of the rotor 50 is located between the position P11 and the position P12 and the rotor 50 is rotating in the reverse direction, the microcomputer 97 determines the position P11 to be the control start position. The microcomputer 97 thus operates as the position determining part.

The microcomputer 97 operating as the positioning part switches over the power supply to the winding set 40 to rotate the rotor 50 and positions the rotor 50 to the control start position, which is determined when operating as the position determining part. Specifically, the microcomputer 97 positions the rotor 50 so that the center C1 of the magnet 52 of the rotor 50 overlaps the position P11 (determined by the position determining part) as shown in FIG. 5B.

The microcomputer 97 operating as the positioning part controls power supply to the winding set 40 so that the position of the rotor 50 rotated by one power supply to the winding set 40, that is, by the power supplied for detecting the position of the rotor 50, does not exceed the control start position. Thus, at the time of positioning after the position detection, it is possible to prevent the rotor 50 from rotating in the opposite direction rapidly from the direction in which the rotor 50 was rotating before the position detection.

The microcomputer 97 operating as the position detecting part controls the power supplied to the winding set 40 so that the torque acceleration, which is the acceleration of torque outputted from the shaft 60, does not exceed the predetermined acceleration. As a result, collision energy, which is generated when the outer wall 611 of the shaft 60 collides against the inner wall 811 of the impeller 80 becomes a predetermined value. The microcomputer 97 operates as a torque acceleration control part. Further in the first embodiment, the microcomputer 97 operating as the torque acceleration control part controls the electric power supplied to the winding set 40 so that the torque acceleration becomes the predetermined target value by feedback control using proportional and integral (PI) control.

In the first embodiment, the microcomputer 97 operating as the position detecting part controls the power supplied to the winding set 40 so that the period of time of power supply to the winding set 40 becomes less than the predetermined period of time. The microcomputer 97 operates as a power supply period control part.

Assuming that a distance (angle) of movement of the rotor 50 from the start time of power supply to the end time of power supply is x, the torque acceleration of the shaft 60 is A, and the power supply period to the winding set 40 is T, the following equation (1) holds.

$$x = A \times T^2 \qquad (1)$$

In the first embodiment, the torque acceleration A and the power supply period T are set to be lower than respective predetermined values so that the position of the rotor 50 does not exceed the control start position with the first power supply (position detection), that is, the distance x becomes less than a distance (angle) y, which is from the center C1 of the magnet 52 of the rotor 50 under the stop state to the control start position.

Figure 6:
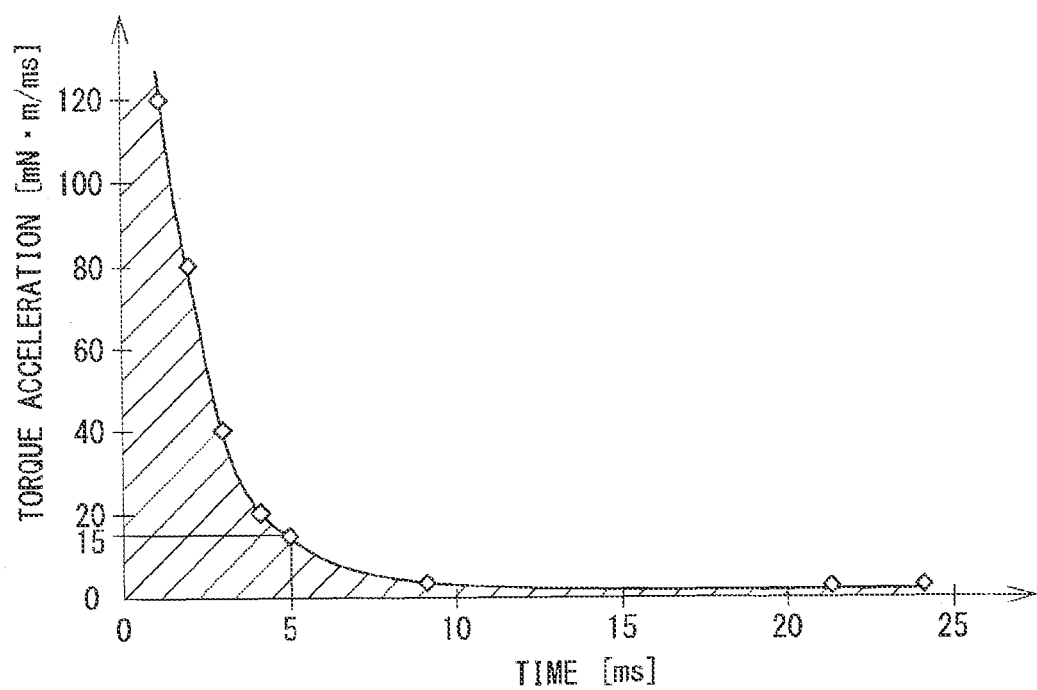
FIG. 6 is a diagrammatic chart showing a range, in which a distance of movement of the rotor is equal to or less than a predetermined value in a relation between a torque acceleration of a shaft and a power supply period for windings in the fuel pump according to the first embodiment.
Figure 7A:
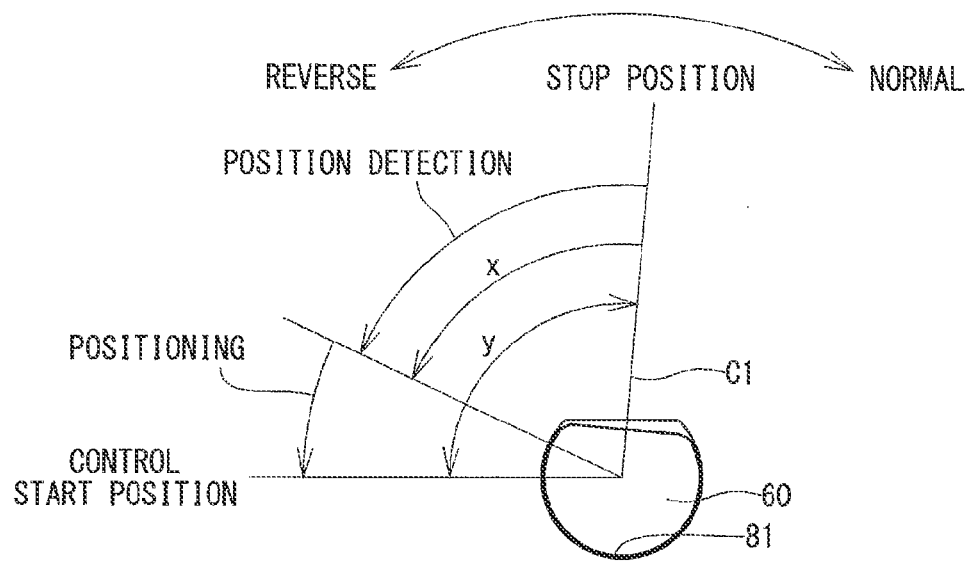
FIG. 7A is a schematic view showing an operation at the time of positioning control of the drive control apparatus according to the first embodiment.

FIG. 6 shows a range (hatched part in FIG. 6), in which the distance x is less than the distance y in the relation between the torque acceleration A of the shaft 60 and the time period T of power supply to the winding set 40. In the first embodiment, based on FIG. 6, the torque acceleration A is set to for example 15 (mN·m/ms) and the power supply period T is set to for example 5 (ms). Thus it is prevented that the position of the rotor 50 rotated with the first power supply to the winding set 40 exceeds the control start position (FIG. 7A).

As described above, in the first embodiment, the microcomputer 97 supplies power to the winding set 40 at least two times until the rotor 50 is positioned to the control start position from the state that the rotor 50 is at rest. One of the two times is for detecting the position of the rotor 50 and the other of the two times is for positioning. That is, the power supply to the winding set 40 is switched over at least once.

Figure 8:
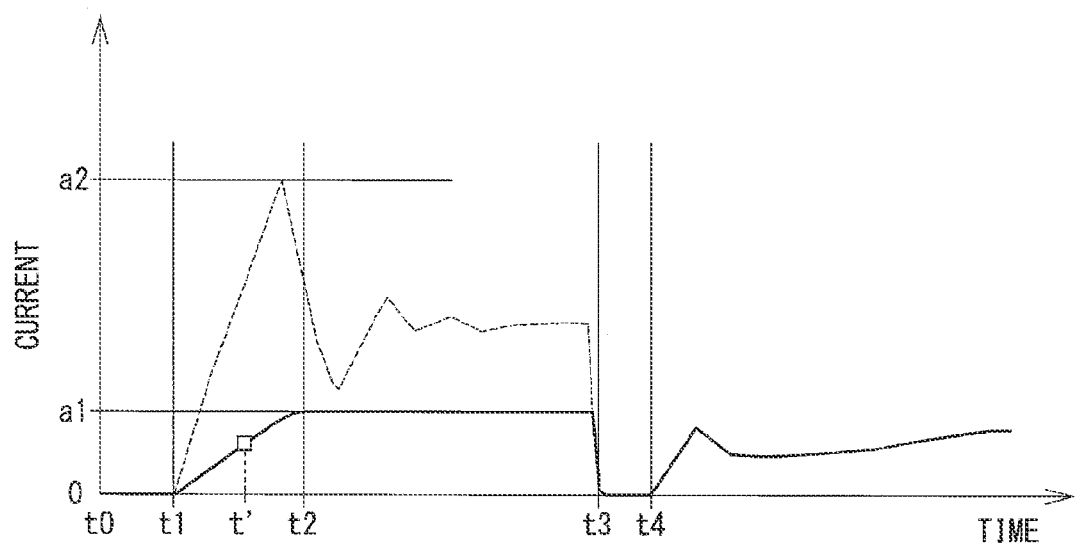
FIG. 8 is a time chart showing an operation of the drive control apparatus, specifically a variation of a current flowing to a brushless motor of the fuel pump with an elapse of time according to the first embodiment.

An operation of the drive control apparatus 90 according to the first embodiment will be described with reference to FIG. 8. A solid line in FIG. 8 shows changes of a value of the current (current value) flowing to the brushless motor 4 relative to time when the driving of the brushless motor 4 is controlled by the drive control apparatus 90. The current value is 0 at time t0 shown in FIG. 8 because the rotor 50 is at rest, that is, being stopped.

When the microcomputer 97 starts controlling positioning of the rotor 50 at time t1, the current value gradually increases. In the first embodiment, when the positioning of the rotor 50 (position detection) is performed, the electric power supplied to the winding set 40 is controlled so that the torque acceleration, which is the acceleration of torque outputted from the shaft 60, is maintained to be lower than the predetermined acceleration. As a result, the slope of the current value is decreased comparatively after time t1. In the first embodiment, since the microcomputer 97 controls the electric power supplied to the winding set 40 by the PI control so that the torque acceleration attains the predetermined target value, the current value becomes a predetermined value a1 at time t2. It is assumed in FIG. 8 that the power supply phase is switched over at time t' before time t2. However, because of inertia of the rotor, the power supply phase switch-over may be delayed to be after time t2 in some cases.

When the positioning of the rotor 50 is finished at time t3, the microcomputer 97 stops the power supply to the winding set 40 and hence the current value becomes 0. Since the rotor 50 is in the state of being positioned to the control start position at time t3, it is possible to start controlling the driving of the brushless motor 4 at time t4. After time t4, the current flows to the brushless motor 4 by way of the normal drive control for the brushless motor 4.

In the exemplary operation of the embodiment shown in FIG. 8, the positioning control is performed during the period t1 to t3 by supplying the electric power first to two phases of the winding set 40 for detecting the direction of rotation of the rotor 50 based on the induction voltage and then to three phases of the winding set 40 to position the rotor 50 at the specified position. The current supply period to each phase in the two-phase power supply operation is for example 5 ms, and the current supply period to each phase in the three-phase power supply operation is for example, 35 ms. In the normal power supply control from time t4, the power supply is performed by forced commutation for rotation in the normal direction under the sensorless control. The current supply period to each phase in the normal power supply control is for example 1.6 ms at 3,000 r.p.m and 0.6 ms at 9,000 rpm.

Here, advantages of the drive control apparatus according to the first embodiment over a drive control apparatus according to a comparative example, the exemplary operation of which is shown in FIG. 8, will be described. A broken line in FIG. 8 shows changes of a value of a current (current value) flowing to a brushless motor relative to time when a drive control apparatus performs normal drive control for the brushless motor from when a rotor is being stopped.

The drive control apparatus according to the comparative example has the same physical configuration as the drive control apparatus 90 according to the first embodiment but does not control the torque acceleration of the shaft 60 at the time of positioning the rotor 50 (position detection). For this reason, the current value increases rapidly after the start of the positioning control at time t1. When the drive control apparatus of the comparative example performs positioning of the rotor 50, the current value reaches a2. Here, a2 is about three times as large as a1. According to the positioning by the drive control apparatus of the comparative example, the current value changes above a value larger than a1 from time t2 to time t3.

Thus, in a case of the drive control apparatus of the comparative example, the current value to the brushless motor 4 at the time of positioning of the rotor 50 is large. It is therefore likely that the collision energy generated at the time of collision of the shaft 60 with the impeller 80 increases. On the other hand, in a case of the drive control apparatus 90 of the first embodiment, the current value to the brushless motor 4 at the time of positioning of the rotor 50 is small. It is therefore possible to decrease the collision energy generated at the time of collision of the shaft 60 with the impeller 80.

In the drive control apparatus of the comparative example, it is likely that the rotor 50 rotates in the normal direction or in the reverse direction each time electric power is supplied to the winding set 40 when the rotor 50 is to be positioned. As a result, a sum of collision energy is likely to increase when the outer wall of the end part 61 of the shaft 60 collides against the inner wall of the hole part 81 of the impeller 80. According to the drive control apparatus 90 of the first embodiment, however, the electric power supplied to the winding set 40 is controlled at the time of positioning of the rotor 50 so that, when the winding set 40 is supplied with power in the number of "n" times, the rotor 50 rotates in the same direction in each power supply. As a result, a sum of the collision energy generated at the time of collision of the outer wall of the end part 61 of the shaft 60 collides against the inner wall of the hole part of the impeller 80 can be reduced.

Figure 7B:
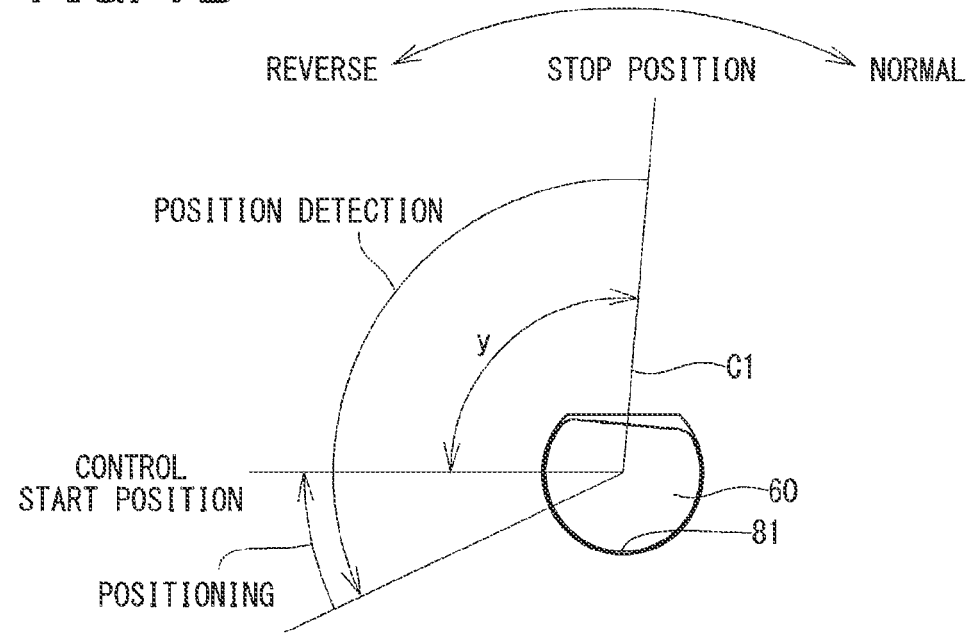
FIG. 7B is a schematic view showing an operation of a drive control apparatus according to a comparative example at the time of positioning control.

In the drive control apparatus of the comparative example, it is likely that the position of the rotor 50 exceeds the control start position with the first power supply to the winding set 40 (position detection) at the time of positioning the rotor 50. When the position of the rotor 50 exceeds the control start position with the first power supply, it is likely that the rotor 50 rotates in the reverse direction and is positioned to the control start position with the second and subsequent power supply (FIG. 7B). For this reason it is likely that the collision energy generated at the time of collision of the outer wall of the shaft 60 with the inner wall of the impeller 80 increases. On the contrary, in the drive control apparatus 90 of the first embodiment, the electric power supplied to the winding set 40 is controlled at the time of positioning of the rotor 50 (FIG. 7A) so that, when the winding set 40 is supplied with the first power supply, the rotor 50 does not exceed the control start position. As a result, it is possible to prevent the rotor 50 from rotating in reverse at the time of the second power supply. It is thus possible to decrease the collision energy generated at the time of collision of the outer wall of the shaft 60 with the inner wall of the impeller 80.

As described above, the first embodiment has the following features.

(1) The drive control apparatus 90 is provide for controlling driving of the brushless motor 4, which includes the stator 30 having the winding set 40 of plural phases (U-phase winding 41, V-phase winding 42, W-phase winding 43), the rotor 50 provided rotatably relative to the stator 30, and the shaft 60 provided in the center of the rotor 50 and having the end part 61 firmly inserted into the hole part 81 of the impeller 80 for rotation with the rotor 50. The drive control apparatus 90 includes the microcomputer 97. The microcomputer 97 is capable of controlling the electric power supplied to the winding set 40 thereby to control the rotation of the rotor 50.

The microcomputer 97 operates as the positioning part. The microcomputer 97 operating as the positioning part supplies the electric power to the winding set 40 "n" times ("n" being an integer equal to 2 or more) before starting to control driving of the brushless motor 4 thereby to position the rotor 50 to the control start position, at which controlling driving of the brushless motor 4 is capable of being started.

The microcomputer 97 operating as the positioning part controls the electric power supplied to the winding set 40 to rotate the rotor 50 in the same direction in each time of power supply when the winding set 40 is supplied with electric power "n" times, that is, the power supply to the winding set 40 is switched over "n−1" times. As a result, the sum of collision energy can be reduced when the outer wall of the end part 61 of the shaft 60 collides against the inner wall of the hole part 81 of the impeller 80. Thus the wear, breakage and the like, which are caused when the outer wall of the shaft 60 collides against the inner wall of the impeller 80, can be reduced. This advantage is particularly remarkable in a case that the brushless motor 4 is controlled many times to turn on and off in the predetermined period and the power supply to the winding set 40 is switched over many times at the time of positioning as exemplified in the first embodiment.

(2) The microcomputer 97 operating as the positioning part controls the electric power supplied to the winding set 40 so that the position of the rotor 50 rotated by the first power supply to the winding set 40 does not exceed the control start position. As a result, it is possible to prevent the rotor 50 from rotating in the reverse direction. Thus the sum of collision energy can be reduced when the outer wall of the end part 61 of the shaft 60 collides against the inner wall of the hole part 81 of the impeller 80.

(3) The microcomputer 97 operating as the positioning part further operates as the position detecting part for supplying the electric power to the winding set 40 to rotate the rotor 50, which is at rest, and detect the position of the rotor 50 relative to the stator 30. The microcomputer 97 operating as the position determining part for determining the control start position based on the position of the rotor 50 detected by the position detecting part. The microcomputer 97 switches over the power supply to the winding set 40 thereby to rotate the rotor 50, and positions the rotor 50 to the control start position determined by the position determining part.

The microcomputer 97 detects the position of the rotor 50, determines the control start position based on the detected position of the rotor 50 and positions the rotor to the determined control start position. As a result, the period of time required before starting the drive control for the brushless motor 4 can be shortened.

(4) The microcomputer 97 operating as the position detecting part further operates as the torque acceleration control part, which controls the electric power supplied to the winding set 40 so that the torque acceleration, which is the acceleration of torque outputted from the shaft 60, is lower than the predetermined acceleration. As a result, the rotor 50 can be controlled not to rotate to the position in excess of the control start position with the first power supply to the winding set 40. The collision energy generated when the outer wall of the shaft 60 collides against the inner wall of the impeller 80 can be reduced.

(5) The microcomputer 97 operating as the torque acceleration control part controls the electric power supplied to the winding set 40 so that the torque acceleration is regulated to the predetermined target value by the PI control. As a result, the torque acceleration of the shaft 60 can be controlled to approach the target value smoothly and reduce the error relative to the target value can be nulled. Further, the torque acceleration of the shaft 60 can be maintained to be lower than the predetermined value (target value).

(6) The microcomputer 97 operating as the position detecting part further operates as the power supply period control part, which controls the power supply period to the winding set 40 so that the power supply period to the winding set is shorter than the predetermined time. As a result, the rotor 50 can be controlled not to rotate to the position in excess of the control start position with the first power supply to the winding set 40. The collision energy generated when the outer wall of the shaft 60 collides against the inner wall of the impeller 80 can be reduced.

(7) The fuel pump 1 comprises the drive control apparatus 90, the brushless motor 4 controlled by the drive control apparatus 90, the housing 5 accommodating the brushless motor 4, the pump cover 10 having the inlet part 11 and closing one end part of the housing 5, the end cover 20 having the outlet part 21 and closing the other end part of the housing 5, and the impeller 80 having the hole part 81 in the center, in which the end part 61 of the shaft 60 is inserted. The impeller 80 rotates with the shaft 60 thereby to pressurize fuel, which flows in from the inlet part 11, and discharges pressurized fuel from the outlet part 21. In a case that the drive control apparatus 90 is applied to control driving of the brushless motor 4 of the fuel pump 1, the sum of collision energy generated when the outer wall of the shaft 60 collides against the inner wall of the impeller 80 can be reduced at the time of positioning of the rotor 50 performed before starting the motor drive control. As a result, the wear and breakage of the impeller 80 of the fuel pump 1 can be reduced.

(8) The end part 61 of the shaft 60 is formed in the alphabet D shape in section on the plane perpendicular to the axis of the shaft 60. The hole part 81 is formed in the alphabet D shape in correspondence to the sectional shape of the end part 61 of the shaft 60. The end part 61 of the shaft 60 is fitted in the hole part 81 and provides the predetermined clearance between the end part 61 of the shaft 60 and the hole part 81. In the fuel pump 1 as configured above, the wear and the breakage of the impeller 80 can be effectively suppressed by controlling the driving of the brushless motor 4 (positioning of the rotor 50) by the drive control apparatus 90.

Other Embodiment

Figure 9:
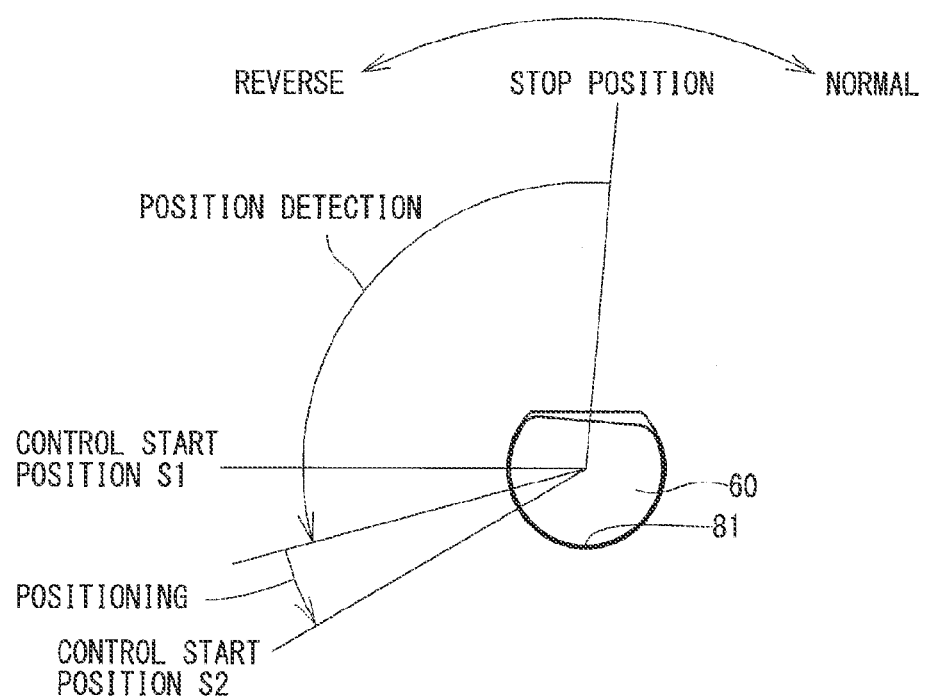
FIG. 9 is a schematic view showing an operation of a drive control apparatus at the time of positioning control according to a second embodiment.

According to a second embodiment, as shown in FIG. 9, the microcomputer 97 determines a next control start position S2 in the same rotation direction as the control start position when the position of the rotor 50 exceeds the expected control start position S1 with the first power supply to the winding set 40 (position detection) at the time of positioning the rotor 50, and positions the rotor 50 to the thus determined control start position. As a result, the rotor 50 is prevented from rotating in the reverse direction at the time of positioning the rotor 50.

According a third embodiment, the microcomputer 97 need not perform the detection of position of the rotor 50 nor the determination of the control start position based on the detected position at the time of positioning the rotor 50, when operating as the positioning part.

According to a fourth embodiment, the microcomputer 97 may control the power supply to the winding set 40 so that the torque acceleration of the shaft 60 increases to be larger than the predetermined acceleration, when operating as the torque acceleration control part. In addition, the microcomputer 97 may control the power supply to the winding set 40 so that the period of power supply to the winding set 40 increases to be longer than the predetermined period, when operating as the torque acceleration control part. For example, the torque acceleration and the period of power supply to the winding set 40 may be set to any values within the cross-hatched ranges of acceleration and period shown in FIG. 6.

According to a fifth embodiment, the microcomputer 97 need not control the power supplied to the winding set 40 to attain the predetermined target value of the torque acceleration by the PI control, when operating as the torque acceleration control part. That is, the torque acceleration may be controlled by proportional control and the like other than the PI control.

According to a sixth embodiment, the microcomputer 97 may supply the power to the winding set 40 any number of times (two or more times) at the time of positioning the rotor 50, when operating as the position determining part. That is, the power supply to the winding set 40 may be switched over any number of times. For example, the power supply may be performed plural times for detecting the position of the rotor 50 and plural times for detecting the position of the rotor 50.

According to a seventh embodiment, the sectional shape of the end part of the shaft and the shape of the hole part of the impeller are not limited to the alphabet D shape and may be, for example, an alphabet I shape, a polygonal shape or any other shapes. Further, the shaft and the impeller may be spline-fitted for example.

The drive control apparatus described above is not limited to the disclosed embodiment but may be used to control driving of a brushless motor, which is used in other devices.

What is claimed is:

1. A fuel pump comprising:
    a drive control apparatus for controlling driving of a brushless motor, which includes a stator on which windings of plural phases are wound, a rotor provided rotatably relative to the stator, and a shaft provided in a radial center of the rotor and having an end part fitted into a hole part of a rotary member for rotation with the rotor, the drive control apparatus comprising:
       a control unit for controlling electric power supplied to the windings thereby to control a rotation of the rotor, wherein:
       the control unit includes a positioning part for supplying the electric power to the windings of the plural phases "n" times ("n" being an integer equal to 2 or more) before starting to control driving of the brushless motor thereby to position the rotor to a control start position, at which controlling driving of the brushless motor is started,
       the positioning part controls the electric power supplied to the windings to rotate the rotor in a same direction in each time of power supply when the windings of the plural phases are supplied with electric power "n" times,
       the end part of the shaft is formed in an alphabet D shape in section on a plane perpendicular to an axis of the shaft,
       the hole part of the rotary member is formed in an alphabet D shape in correspondence to a sectional shape of the end part of the shaft,
       the end part of the shaft is fitted in the hole part of the rotary member,
       the end part of the shaft provides a predetermined clearance between the end part of the shaft and the hole part of the rotary member, the predetermined clearance allowing relative movement between the end part of the shaft and the hole part of the rotary member, and
       the brushless motor is controlled by the drive control apparatus;
    a housing accommodating the brushless motor;
    a pump cover having an inlet part and closing one end part of the housing; and
    an end cover having an outlet part and closing an other end pan of the housing; and
    the rotary member having the hole part in the radial center, in which the end part of the shaft is fitted, the rotary member rotating with the shaft thereby to pressurize fuel, which flows in from the inlet part, and discharges pressurized fuel from the outlet part.

2. The fuel pump according to claim 1, wherein:
    the positioning part controls the electric power supplied to the windings so that a position of the rotor rotated by a first power supply to the windings does not exceed the control start position.

3. The fuel pump according to claim 2, wherein:
    the positioning part controls a power supply period "T" of the first power supply to the windings and a torque acceleration "A" of the shaft so that a distance of movement "x" of the rotor rotated by the first power supply does not exceed a predetermined value indicating a distance between a circumferential center of a permanent magnet of the rotor and the control start position, the distance of movement being defined as $x = A \times T^2$.

4. The fuel pump according to claim 3, wherein:
    the torque acceleration is feedback-controlled to a predetermined acceleration target value.

5. The fuel pump according to claim 1, wherein:
    the positioning part includes a position detecting part for supplying the electric power to the windings of the plural phases to rotate the rotor at rest and detecting the position of the rotor relative to the stator, and a position determining part for determining the control start position based on the position of the rotor detected by the position detecting part; and
    the positioning part switches over the power supply to the windings thereby to rotate the rotor, and positions the rotor to the control start position determined by the position determining part.

6. The fuel pump according to claim 5, wherein:
    the position detecting part includes a torque acceleration control part, which controls the electric power supplied to the windings so that a torque acceleration, which is an acceleration of torque outputted from the shaft, is lower than a predetermined acceleration.

7. The fuel pump according to claim 6, wherein:
    the torque acceleration control part controls the electric power supplied to the windings so that the torque acceleration is regulated to a predetermined target value by proportional and integral control.

8. The fuel pump according to claim 5, wherein:
    the position detecting part includes a power supply period control part, which controls the power supply to the windings so that a period of power supply to the windings is shorter than a predetermined time period.

9. A fuel pump comprising:
    a drive control apparatus for controlling driving of a brushless motor, which includes a stator on which windings of plural phases are wound, a rotor provided rotatably relative to the stator, and a shaft provided in a radial center of the rotor and having an end part fitted into a hole part of a rotary member for rotation with the rotor, the drive control apparatus comprising:
       a control unit for controlling electric power supplied to the windings thereby to control a rotation of the rotor, wherein:
       the control unit includes a positioning part for supplying the electric power to the windings of the plural phases "n" times ("n" being an integer equal to 2 or more) before starting to control driving of the brushless motor thereby to position the rotor to a control start position, at which controlling driving of the brushless motor is started, the positioning part controls the electric power supplied to the windings to rotate the rotor in a same direction in each time of power supply when the windings of the plural phases are supplied with electric power "n" times, and the brushless motor is controlled by the drive control apparatus;

a housing accommodating the brushless motor;

a pump cover having an inlet part and closing one end part of the housing;

an end cover having an outlet part and closing an other end part of the housing; and the rotary member having the hole part in the radial center, in which the end part of the shaft is fitted, the rotary member rotating with the shaft thereby to pressurize fuel, which flows in from the inlet part, and discharges pressurized fuel from the outlet part.

\* \* \* \* \*